United States Patent Office 2,784,087
Patented Mar. 5, 1957

2,784,087

PHOTOGRAPHIC LIGHT SENSITIVE ELEMENTS CONTAINING ULTRA-VIOLET FILTERS

George W. Sawdey and James A. Van Allan, Rochester, N. Y., assignors to Eastman Kodak Company, Rochester, N. Y., a corporation of New Jersey No Drawing. Application September 20, 1954, Serial No. 457,304

4 Claims. (Cl. 96—84)

This invention relates to new thiazolidone compounds, which are useful as ultra-violet filtering agents, and a method for making them.

The new thiazolidone compounds of our invention can advantageously be represented by the following general formula:

I.
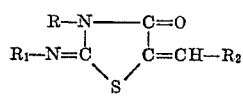

wherein R represents the radical:

Ia.
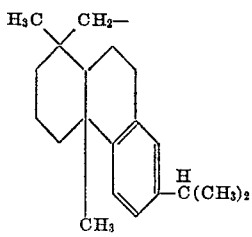

and wherein $R_1$ represents an aryl group, such as phenyl, o-, m-, and p-chlorophenyl, o-, m-, and p-tolyl, o-, m-, and p-ethylphenyl, p-amylphenyl, o-, m-, and p-ethoxyphenyl, etc. (e. g., a mononuclear aromatic group of the benzene series containing from 6 to 11 carbon atoms), or an aralkyl group, such as benzyl, β-phenylethyl, α-phenylethyl, etc. (e. g., a mononuclear aralykyl group containing from 7 to 8 carbon atoms) and $R_2$ represents an aryl group, such as phenyl, o-, m-, and p-tolyl, o-, m-, and p-ethylphenyl, p-isopropylphenyl, p-amylphenyl, o-, m-, and p-methoxyphenyl, o-, m-, and p-ethoxyphenyl, β-hydroxyethylphenyl, o-, m-, and p-chlorophenyl, o-, m-, and p-hydroxyphenyl, o-, m-, and p-sulfophenyl (and alkali metal salts thereof, e. g., sodium, potassium, etc.), 4-methoxy-3-sulfophenyl (and alkali metal salts thereof, e. g., sodium, potassium, etc.), 2,4-dicarboxymethylphenyl (and alkali metal salts thereof, e. g., sodium, potassium, etc.), o-, m-, and p-carboxyphenyl (and alkali metal salts thereof, e. g., sodium, potassium, etc.), 3-(3-sulfobenzamido)phenyl (and alkali metal salts thereof, e. g., sodium, potassium, etc.), o-carbobutoxyphenyl, diamylphenoxyacetoxyphenyl, etc. (e. g., a carbocyclic aromatic group of the benzene series containing from 6 to 24, and more particularly 6 to 11, carbon atoms).

It is, therefore, an object of our invention to provide new thiazolidone compounds and a method for making them. Another object is to provide a new intermediate for making these new thiazolidone compounds. Still another object is to provide photographic elements containing these new thiazolidone compounds. Other objects will become apparent from a consideration of the following description and examples.

According to our invention, we provide the compounds selected from those represented by Formula I above by intermixing a compound selected from those represented by the following general formula:

II.
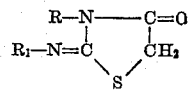

wherein R and $R_1$ each have the values given above, with an aldehyde of the following general formula:

III.

wherein $R_2$ has the values given above. Heat accelerates the resulting condensation reaction, although temperatures varying from ambient temperature to the reflux temperature of the reaction mixture can conveniently be employed. An inert diluent, e. g., acetic acid, methanol, ethanol, etc., can be employed to advantage. Condensing agents, such as piperidine, acetic anhydride, alkali metal carboxylates (e. g., sodium acetate, potassium acetate, etc.), etc. can be employed if desired.

The intermediates selected from those represented by Formula II above can advantageously be prepared by intermixing a compound selected from those represented by the following general formula:

IV.
$$R-NH-\overset{S}{\underset{\|}{C}}-NH-R_1$$

wherein R and $R_1$ each have the values given above, with an ester selected from those represented by the following general formula:

V.
$$X-CH_2\overset{O}{\underset{\|}{C}}-OR_3$$

wherein $R_3$ represents a lower alkyl group, such as methyl, ethyl, etc., and X represents a halogen atom, such as chlorine, bromine, etc. The condensations can advantageously be carried out in the presence of an inert diluent, such as methanol, ethanol, etc. A hydrohalide acceptor, such as pyridine, quinoline, collidines, etc. can advantageously be employed. Heat accelerates the condensations, although temperatures varying from ambient temperature to the reflux temperature of the reaction mixture can advantageously be employed.

The intermediates selected from those represented by Formula IV above can be prepared by intermixing a compound selected from those represented by the following general formula:

VI.
$$R_1-NCS$$

wherein $R_1$ has the values given above, with the compound represented by the formula:

VII.
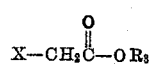

1-aminomethyl-7-isopropyl-1,4a-dimethyl-1,2,3,4,4a,9,10,10a-octahydrophenanthrene which is hereinafter identified as "rosyl amine" (sold as Rosin Amine D by Hercules Powder Co.). The condensations are advantageously carried out in the presence of an inert diluent, such as petroleum ether, hexane, benzene, etc. (or other liquid hydrocarbons). Heat accelerates the condensations, although temperatures varying from ambient temperature to the reflux temperature of the reaction mixture can advantageously be employed.

The following examples will serve to illustrate more fully the manner of practicing our invention.

*Example 1.—N-phenyl-N'-rosylthiourea*

57 g. of Rosin Amine D (10.2 mol.) were dissolved in 150 ml. of ligroin, and 28 g. (25 ml.) of phenylisothiocyanate were added at room temperature. The reaction mixture was then refluxed for 1 hour and the ligroin removed under vacuum. The yield of crude product was 84 g. It was used without purification in the following example.

*Example 2.—2-phenylimino-3-rosyl-4-thiazolidone*

84 g. of N-phenyl-N'-rosylthiourea, obtained in Example 1 above, 25.5 g. of (22 ml.) of ethyl chloroacetate, 18 ml. of pyridine, and 200 ml. of ethanol were refluxed together for 3 hours. The ethanol was removed under vacuum and 250 ml. of water were added. The oil which separated was taken up in benzene, dried, and the benzene removed under vacuum. The desired product was obtained as a hard, glassy solid, weighing 83 g.

*Example 3.—5-benzal-2-phenylimino-3-rosyl-5-thiazolidone*

83 g. of 2-phenylimino-3-rosyl-4-thiazolidone, obtained in Example 2 above, 26.2 g. (25 ml.) of benzaldehyde, 18 ml. of piperidine, and 250 ml. of methanol were refluxed for five hours. On cooling, a thick oil separated. The methanol was decanted and the residue washed several times with methanol. The desired product was obtained as an oil and it weighed 66 g.

*Analysis.*—Calculated for $C_{36}H_{40}ON_2S$: C, 78.7; H, 7.3. Found: C, 78.1; H, 7.4.

Listed below are further examples of other new thiazolidone compounds, obtained according to our invention by replacing the phenylisothiocyanate of Example 1 and the benzaldehyde of Example 3 by molecularly equivalent weights of other arylisothiocyanates or aralkylisothiocyanates and aromatic aldehydes, respectively. (R is defined above.)

1.

2-phenylimino-3-rosyl-5-(o-sulfobenzal)-4-thiazolidone (sodium salt)

2.

5-[2,4-bis(carboxymethoxy)benzal]-2-phenylimino-3-rosyl-4-thiazolidone (sodium salt)

3.

5-[3-(2,4-ditertiaryamylphenoxyacetoxy)benzal]-2-phenylimino-3-rosyl-4-thiazolidone

4.

2-benzylimino-5-(p-ethoxybenzal)-3-rosyl-4-thiazolidone

These ultraviolet absorbing compounds can be incorporated in the photographic element in a variety of ways, depending on the ultimate use of the photographic element and the degree of protection desired. Advantageously, the ultraviolet absorbing compound can be dissolved or dispersed in a solvent medium together with a colloidal binder, such as gelatin, cellulose esters (e. g., cellulose acetate, etc.), synthetic resins (e. g., polyvinyl acetals, hydrolyzed polyvinyl acetate, etc.), etc., and the resulting mixture coated over the light-sensitive layer (i. e., silver halide emulsion layer) of the photographic element. Where the photographic element is a material intended for use in color photography, the ultraviolet filter layer need not be an outer layer, but this layer can be placed over one of the layers subject to the harmful effects of ultraviolet radiation. For example, in a multilayer material comprising three differentially sensitized layers, the red sensitive layer being adjacent to the support, the green sensitive layer being superposed on the red sensitive layer, and the blue sensitive layer being outermost with respect to the other light-sensitive layers, the ultraviolet filter layer can be placed between the blue and green sensitive layers. Alternatively, the ultraviolet filter layer can be placed between the green and the red sensitive layers. If desired, the material useful in absorbing the ultraviolet radiation can be incorporated directly in the light-sensitive emulsion instead of, or in addition to, being present in another layer. The amount of ultraviolet absorbing compound used can be varied, depending upon the effect desired and the use to which the material is to be put.

The product obtained in Example 3 was found to have its maximum absorption at 329 mu ($\lambda$ max.). It was dissolved in iso-octane and found to have an extinction coefficient ($\epsilon$) of 26,000. It had good solubility in dibutyl phthalate (1:1 dispersions) and freedom from crystallization. The solutions in dibutyl phthalate can be readily mixed with aqueous gelatin solutions, (containing about 5 percent gelatin, for example), and the dispersions coated on a suitable support, e. g., cellulose acetate, glass, polyvinyl acetal, etc. Such a coating showed minimum visual absorption, and its stability to light, based on two weeks' exposure in an east window, was excellent.

What we claim as our invention and desire secured by Letters Patent of the United States is:

1. A photographic element comprising a support, at least one photographic silver halide emulsion layer, and incorporated in one of the layers of said photographic element a compound selected from those represented by the following general formula:

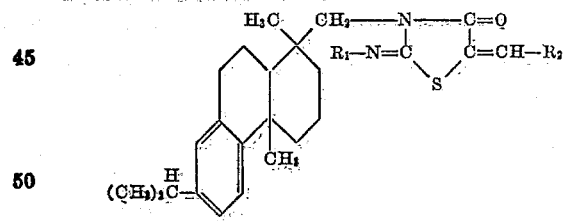

wherein $R_1$ represents a member selected from the group consisting of an aryl group and an aralkyl group and $R_2$ represents an aryl group.

2. A photographic element comprising a support, at least one photographic silver halide emulsion layer, and incorporated in one of the layers of said photographic element a compound selected from those represented by the following general formula:

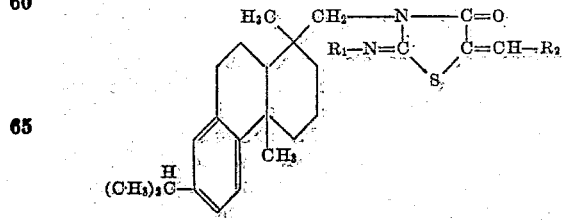

wherein $R_1$ represents a mononuclear aromatic group of the benzene series containing from 6 to 11 carbon atoms and $R_2$ represents a carbocyclic aromatic group of the benzene series containing from 6 to 24 carbon atoms.

3. A photographic element comprising a support, at least one photographic silver halide emulsion layer, and incorporated in one of the layers of said photographic element a compound selected from those represented by the following general formula:

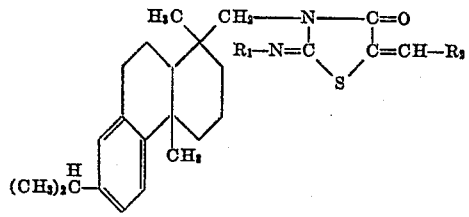

wherein $R_1$ and $R_2$ each represents a mononuclear aromatic group of the benzene series containing from 6 to 11 carbon atoms.

4. A photographic element comprising a support, at least one photographic silver halide emulsion layer, and incorporated in one of the layers of said photographic element the compound represented by the following formula:

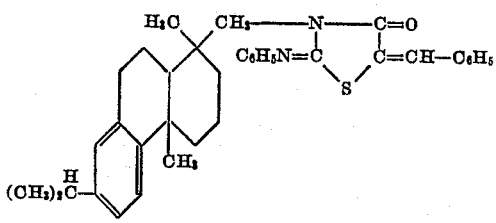

References Cited in the file of this patent

UNITED STATES PATENTS

| | | |
|---|---|---|
| 2,533,472 | Keyes et al. | Dec. 12, 1950 |
| 2,617,808 | Schenck et al. | Nov. 11, 1952 |
| 2,678,929 | Grundy et al. | May 18, 1954 |
| 2,685,512 | Sawdey | Aug. 3, 1954 |